(12) United States Patent
Sato

(10) Patent No.: US 6,612,107 B2
(45) Date of Patent: Sep. 2, 2003

(54) ONE-WAY CLUTCH

(75) Inventor: Naoto Sato, Shizuoka (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 0 days.

(21) Appl. No.: 10/122,187

(22) Filed: Apr. 16, 2002

(65) Prior Publication Data

US 2002/0153217 A1 Oct. 24, 2002

(51) Int. Cl.[7] .................................... F16D 41/06
(52) U.S. Cl. ......................... 60/345; 192/45.1
(58) Field of Search .................. 60/341, 345, 346; 192/45.1

(56) References Cited

U.S. PATENT DOCUMENTS

| | | | | |
|---|---|---|---|---|
| 2,670,825 A | * | 3/1954 | Cherry | 192/45.1 |
| 3,054,489 A | * | 9/1962 | Fahlberg | 192/45 |
| 3,087,589 A | * | 4/1963 | Gorsky | 192/45 |
| 3,732,957 A | * | 5/1973 | McEwen | 192/45 |
| 4,926,631 A | * | 5/1990 | Sorenson | 192/45.1 |
| 5,094,076 A | * | 3/1992 | Henricks | 60/345 |
| 5,099,972 A | * | 3/1992 | Ouchi | 192/45 |
| 5,125,487 A | * | 6/1992 | Hodge | 60/345 |
| 5,586,434 A | * | 12/1996 | Okubo et al. | 60/345 |

FOREIGN PATENT DOCUMENTS

| | | |
|---|---|---|
| JP | 11-51091 | 2/1999 |
| JP | 11-182588 | 7/1999 |

* cited by examiner

*Primary Examiner*—Edward K. Look
*Assistant Examiner*—Thomas E. Lazo
(74) *Attorney, Agent, or Firm*—Arent Fox Kintner Plotkin & Kahn, PLLC

(57) ABSTRACT

A one-way clutch includes poles and springs accommodated in pockets defined in an inner peripheral surface of an outer race. The poles are urged toward an outer peripheral surface of the inner race by resilient forces of the springs, thereby inhibiting the relative rotation of the inner race and the outer race relative to each other in one direction, and permitting the relative rotation of the inner race and the outer race relative to each other in the other direction. Each of the poles has a partially columnar support projection, and an engage portion comprising a convex curved surface. The support projection is swingably supported in and substantially in face contact with a partially columnar support recess defined in the pocket. The engage portion is in line contact with the outer peripheral surface of the inner race comprising the columnar surface.

2 Claims, 4 Drawing Sheets

ONE-WAY CLUTCH

BACKGROUND OF THE INVENTION

1. Field of the Invention

The present invention relates to a one-way clutch including a locking element accommodated in a pocket defined in an inner peripheral surface of an outer race, the locking element being urged by a spring toward an outer peripheral surface, thereby inhibiting the relative rotation of an inner race and the outer race relative to each other in one direction, and permitting the relative rotation of an inner race and the outer race relative to each other in the other direction.

2. Description of the Related Art

Such one-way clutch is known, for example, from Japanese Patent Application Laid-open No. 11-51091. In this one-way clutch, a roller is used as the locking element. When the inner race and the outer race are rotated in one direction relative to each other, the roller is forced into and locked in a wedge-shaped space between both the races by a resilient force of the spring. When the inner race and the outer race are rotated in the other direction relative to each other, the roller is moved against the resilient force of the spring and thus unlocked.

Japanese Patent Application Laid-open No. 11-182588 describes a one-way clutch in which a sprag is used as a locking element. The sprag is a member of a radially centrally constricted shape, and is swingably supported at its constricted portion by a retainer and a ribbon spring disposed between an inner race and an outer race.

The one-way clutch in which the roller or the sprag is used as the locking element, suffers from the following problem: The locking element is brought into line contact with the inner race and the outer race and for this reason, the surface pressure at contact portions is increased to provide an adverse effect to the durability. In addition, the one-way clutch using the sprag suffers from a problem that its structure is complicated since it requires a retainer and a ribbon spring for swingably supporting the sprag, resulting in increased cost.

SUMMARY OF THE INVENTION

The present invention has been achieved with the above circumstances in view, and it is an object of the present invention to provide a one-way clutch, wherein a load acting on the locking element can be reduced in a simple structure.

To achieve the above object, according to a first aspect and feature of the present invention, there is provided a one-way clutch comprising locking elements each accommodated in each of pockets defined in an inner peripheral surface of an outer race, each of the locking elements being urged by a spring toward an outer peripheral surface an inner race, thereby inhibiting the relative rotation of the inner race and the outer race relative to each other in one direction, and permitting the relative rotation of the inner race and the outer race relative to each other in the other direction, wherein each of the locking elements is formed with a partially columnar support projection and an engage portion comprising a convex curved surface, the support projection being swingably supported in and substantially in face contact with a partially columnar support recess defined in the corresponding pocket, the engage portion being in line contact with an outer peripheral surface of the inner race comprising a columnar surface.

With the above arrangement, each of the locking element is swingably supported in the partially columnar support recess defined in the corresponding pocket, with the partially columnar support projection formed on the locking element being substantially in face contact with the partially columnar support recess. Therefore, the surface pressure on contact portions of the locking element and the pocket can be reduced as compared with the surface pressure of the line contact, leading to an enhancement in durability of the locking element and the outer race. In addition, the engage portion comprising the convex curved surface formed on the locking element is in line contact with the outer peripheral surface of the inner race comprising the columnar surface and hence, the inner race and the outer race can be locked at any phase, unlike a one-way clutch in which a pole and a notch are brought into engagement with each other.

According to a second aspect and feature of the present invention, in addition to the arrangement of the first feature, there is provided a one-way clutch wherein the outer race is formed integrally with a stator of a torque converter and supported on stator-supporting members with a pair of thrust bearings interposed therebetween, and the locking element accommodated in each of the pockets in the outer race is prevented from being fallen off by the thrust bearings.

With the above arrangement, the outer race of the one-way clutch is formed integrally with the stator of the torque converter and hence, the number of parts can be reduced, as compared with a case where the outer race and the stator are separate members. In addition, the falling-off of the locking element accommodated in each of the pockets in the outer race is prevented by the pair of thrust bearings for supporting the outer race on the stator-supporting members. Therefore, a special member for retaining the locking element in each of the pockets is not required, leading to a reduction in number of parts, but also the width of each of the locking elements can be increased up to the entire width of the corresponding pocket, whereby the surface pressure acting on the locking element can be reduced, and the number and size of the locking elements can be reduced.

A pole 53 in the embodiment corresponds to the locking element of the present invention, and a boss 22 and an auxiliary-driving shaft 29 in the embodiment corresponds to the stator-supporting members.

The above and other objects, features and advantages of the invention will become apparent from the following description of the preferred embodiment taken in conjunction with the accompanying drawings.

DESCRIPTION OF THE PREFERRED EMBODIMENT

The present invention will now be described by way of an embodiment with reference to the accompanying drawings.

Figure 1:
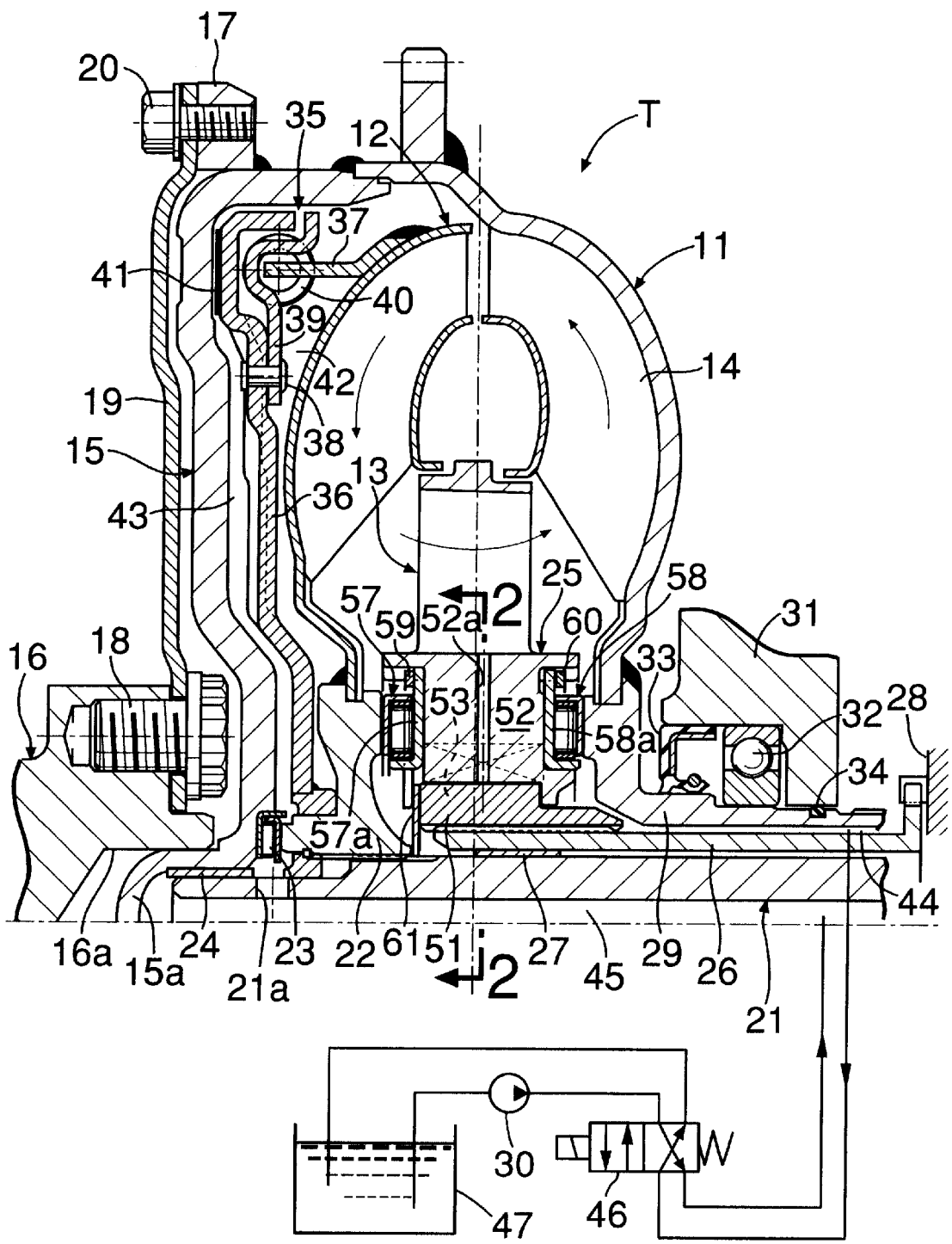
FIG. 1 is a vertical sectional view of a torque converter including a one-way clutch according to the present invention.

Referring first to FIG. 1, a torque converter T for an automatic transmission for an automobile includes a pump impeller 11, a turbine runner 12 opposed to the pump impeller 11, and a stator 13 disposed between inner peripheries of the pump impeller 11 and the turbine runner 12. A circulating circuit 14 for transmitting a power by a working oil is defined between the pump impeller 11, the turbine runner 12 and the stator 13.

A side cover 15 is fixed to the pump impeller 11 by welding to surround an outer surface of the turbine runner 12. A support shaft portion 15a is integrally formed at the center of an outer surface of the side cover 15 and fitted into a shaft bore 16a at the center of an axial end of a crankshaft 16 of an engine. A connecting ring 17 welded to an outer peripheral surface of the side cover 15 is coupled by bolt 20 to a drive plate 19 fixed to the crankshaft 16 by a bolt 18.

An output shaft 21 coaxial with the crankshaft 16 is disposed at the center of the torque converter T, and a boss 22 of the turbine runner 12 is spline-fitted to an outer periphery of the output shaft 21. The output shaft 21 serves as a main shaft of the automatic transmission. A thrust bearing 23 is disposed between the boss 22 of the turbine runner 12 and the side cover 15, and a bearing bush 24 is disposed between an outer peripheral surface of a tip end of the output shaft 21 and an inner peripheral surface of the support shaft portion 15a of the side cover 15. A cylindrical stator shaft 26 is disposed around an outer periphery of the output shaft 21, and the stator 13 is carried on the cylindrical stator shaft 26 through a one-way clutch 25. A bearing bush 27 is interposed between the output shaft 21 and the stator shaft 26. The stator shaft 26 is non-rotatably supported at its outer end on a mission case 28.

An auxiliary-driving shaft 29 welded to the pump impeller 11 is relatively rotatably disposed around an outer periphery of the stator shaft 26, so that an oil pump 30 for supplying the working oil to the torque converter T is driven by the auxiliary-driving shaft 29. The auxiliary-driving shaft 29 is supported on a torque converter case 31 with a ball bearing 32 interposed therebetween, and the auxiliary-driving shaft 29 and the torque converter 31 are sealed from each other by seal members 33 and 34.

A lock-up clutch 35 is disposed between the turbine runner 12 and the side cover 15, and includes a disk-shaped piston 36 whose inner peripheral surface is slidably supported on an outer peripheral surface of the boss 22 of the turbine runner 12. A stay 37 welded to the turbine runner 12 and a spring seat 39 fixed to the piston 36 by a rivet 38 are connected to each other by a damper spring 40 disposed circumferentially. A friction lining 41 is fixed to an outer periphery of the piston 36 and capable of abutting against an inner wall of the side cover 15.

A first oil chamber 42 is defined between the piston 36 of the lock-up clutch 35 and the turbine runner 12, and a second oil chamber 43 is defined between the piston 36 and the side cover 15. The first oil chamber 42 communicates with a space between the pump impeller 11 and the turbine runner 12 and further communicates with a first oil passage 44 between the auxiliary-driving shaft 29 and the stator shaft 26. The second oil chamber 43 communicates with a second oil passage 45 defined at the center of the output shaft 21 through the oil bore 21a in the output shaft 21. The first and second oil passages 44 and 45 are connected alternately to a discharge side of the oil pump 30 and an oil reservoir 47 by a lock-up control valve 46.

Figure 3:
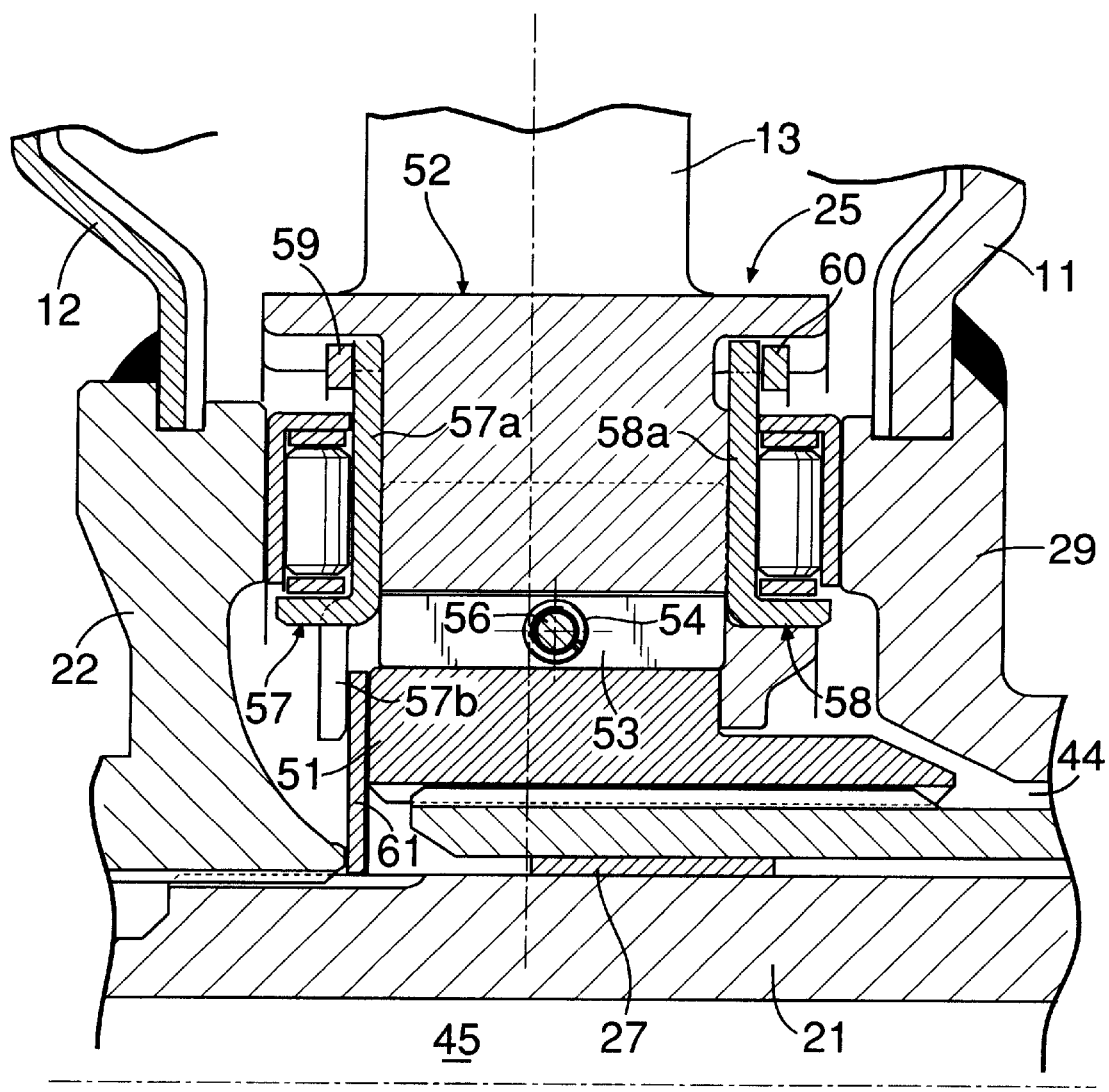
FIG. 3 is a sectional view taken along a line 3—3 in FIG. 2.
Figure 4:
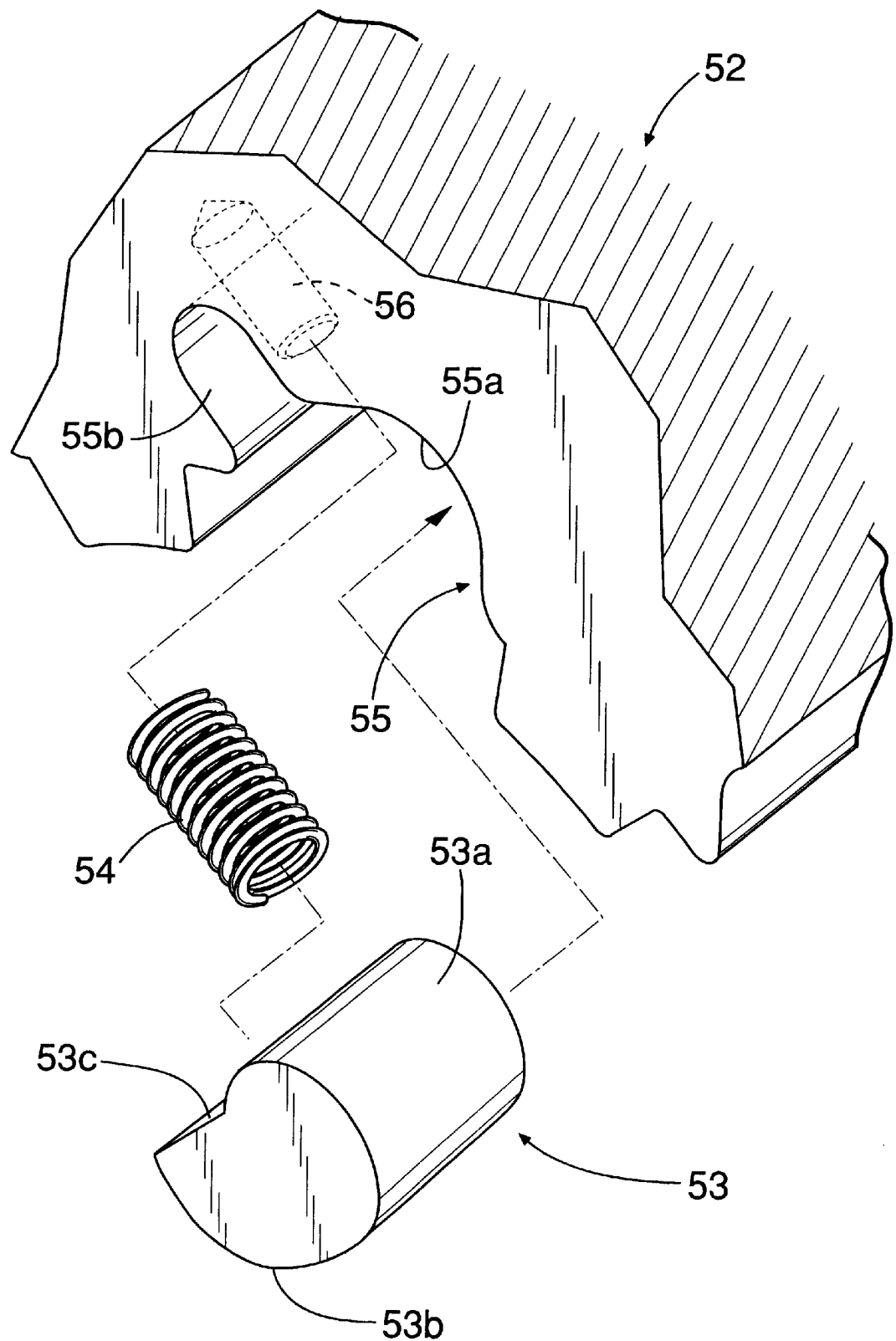
FIG. 4 is an enlarged perspective view of an outer race, a pole and a spring.

The structure of the one-way clutch 25 will be described below with reference to FIGS. 2 to 4.

The one-way clutch 25 includes an inner race 51 spline-coupled to the outer periphery of the stator shaft 26, an outer race 52 also serving as a boss of the stator 13, seven poles 53, and seven springs 54 for urging the poles 53. Seven pockets 55 for accommodation of the poles 53 and the springs 54 are defined in an inner peripheral surface of the outer race 52. Each of the pockets 55 includes a partially columnar support recess 55a, and a spring-accommodating portion 55b in which the spring 54 is accommodated. A positioning pin 56 is provided at a bottom of the spring-accommodating portion 55b to position each of the springs 54. On the other hand, The pole 53 accommodated in each of the pockets 55 includes a partially columnar support projection 53a supported in the support recess 55a, an engage portion 53b comprising a convex curved surface capable of abutting against a columnar outer peripheral surface of the inner race 51, and a spring seat 53c for supporting the spring 54.

Seven slide faces 52a are formed between the seven pockets 55 in the outer race 52 and put into slidable abutment against the outer peripheral surface of the inner race 51, whereby a side plate which is a component for centering the inner race 51 and the outer race 52 can be eliminated. The support recess 55a in each of the pocket 55 and the support projection 53a on each of the poles 53 are substantially in face contact with each other at their partially columnar faces, and the engage portion 53b of the pole 53 and the outer peripheral surface of the inner race 51 are in line contact with each other. A plurality of oil bores 52b are defined in the outer race 52 to permit the communication between the outer and inner peripheral surfaces of the outer race 52 in order to lubricate the slide faces 52a between the inner race 51 and the outer race 52, slide faces between the poles 53 and the pockets 55 and slide faces between the poles 53 and the inner races 51.

The support recess 55a in each of the pockets 55 has a radius of curvature slightly larger than that of the support projection 53a on each of the poles 53. Therefore, strictly speaking, the support recess 55a and the support projection 53a are in line contact with each other when no or a small load is acting thereon, but are substantially in face contact with each other due to the resilient deformation of the contact portions when a large load is acting thereon.

Opposite sides of the outer race 52 are supported on the boss 22 constituting a stator-supporting member according to the present invention and the auxiliary-driving shaft 29 with thrust bearings 57 and 58 interposed therebetween, respectively. A back plate 57a of the thrust bearing 57 is locked to the outer race 52 by a clip 59 and covers a portion of an opening in one end of each of the pockets 55 in the outer race 52 to inhibit the falling of the pole 53. Further, a locking claw 57b formed by cutting and raising a portion of the back plate 57a locks a left end face of the inner race 51 through a washer 61, thereby inhibiting the axial movement of the inner race 51. In addition, a back plate 58a of the thrust bearing 58 is locked to the outer race 52 by a clip 60 and covers a portion of an opening in the other end of each of the pockets 55 in the outer race 52 to inhibit the falling of the pole 53.

The operation of the embodiment of the present invention having the above-described arrangement will be described below.

In an idling range to a low-speed operational range of the engine, the second oil passage 45 is connected to the discharge side of the oil pump 30 and the first oil passage 44 is connected to the oil reservoir 47 by the lock-up control valve 46, as shown in FIG. 1. When a rotational torque of the crankshaft 16 of the engine is transmitted through the drive plate 19, the connecting ring 17, the side cover 15 and the pump impeller 11 to the auxiliary-driving shaft 29, the oil pump 30 is driven, and the working oil discharged from the oil pump 30 flows from the lock-up control valve 46 through the second oil passage 45 and the oil bore 21a into the second oil chamber 43. As a result, the piston 36 is moved toward the first oil chamber 42, so that the friction lining 41 is moved away from the side cover 15, whereby the lock-up clutch 35 is brought into a non-engaged state to permit the relative rotation of the pump impeller 11 and the turbine runner 12 relative to each other.

The working oil flowing from the second oil chamber 43 into the first oil chamber 42 flows from between the pump impeller 11 and the turbine runner 12 into the circulating circuit 14 to fill the circulating circuit 14, and then flows through the first oil passage 44 back to the oil reservoir 47.

Thus, when the rotation of the crankshaft 16 is transmitted to the pump impeller 11, the working oil filling the circulating circuit 14 transmits the rotational torque of the pump impeller 11 to the turbine runner 12 to drive the output shaft 21, while circulating through the pump impeller 11, the turbine runner 12, the stator 13 and the pump impeller 11. If a torque amplifying effect is produced between the pump impeller 11 and the turbine runner 12 in this process, the resultant reaction force is borne by the stator 13, and the stator 13 is fixed by the one-way clutch 25.

Figure 2:
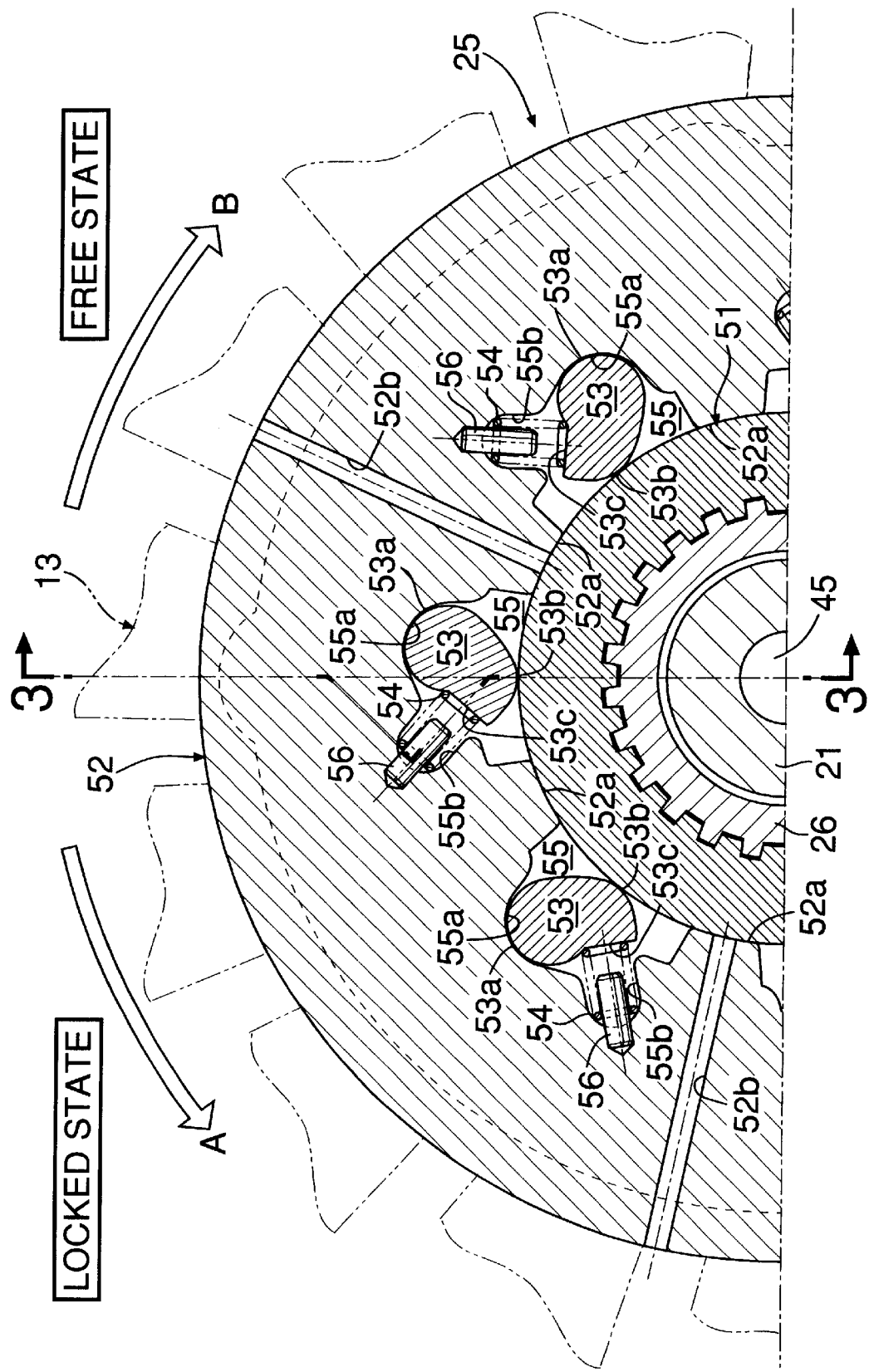
FIG. 2 is an enlarged sectional view taken along a line 2—2 in FIG. 1.

That is, when the stator 13 is about to rotate in a direction shown by Arrow A in FIG. 2, the engage portions 53b of the poles 53 accommodated in the pockets 55 in the outer race 52 integral with the stator 13 are swung in a counterclockwise direction under resilient forces of the springs 54 and a load received from the outer peripheral surface of the inner race 51, to strongly bite into the outer peripheral surface of the inner race 51, whereby the outer race 52 and the inner race 51 are integrated with each other. Thus, the stator 13 is non-rotatably fixed to the mission case 28 through the one-way clutch 25 and the stator shaft 26.

When the speed ratio of the torque converter T becomes closer to 1 with an increase in rotational speed of the engine, so that the torque amplifying effect is not exhibited by the stator 13, a load shown by Arrow B in FIG. 2 acts on the stator 13, whereby the one-way clutch 25 is brought into a free state. As a result, the stator 13 is rotated in the same direction as the pump impeller 11 and the turbine runner 12, while racing the one-way clutch 25. That is, when the load in the direction of Arrow B acts on the stator 13, the engage portions 53b of the poles 53 provided in the pockets 55 in the outer race 52 integral with the stator 13 are slid along the outer peripheral surface of the inner race 51 and hence, the outer race 52 integral with the stator 13 can be rotated freely relative to the inner race 51 integral with the mission case 28.

When the torque converter T has been brought into such a coupling state, the lock-up control valve 46 is switched over to connect the first oil passage 44 to the discharge side of the oil pump 30 and to connect the second oil passage 45 to the oil reservoir 47. As a result, the working oil discharged from the oil pump 30 is supplied in a direction opposite from the above-described direction, i.e., from the first oil chamber 44 via the circulating circuit 14 to the first oil chamber 42, and the second oil 43 is opened to the oil reservoir 47 via the second oil passage 45. Therefore, the piston 36 is urged from the side of the first oil chamber 42 toward the second oil chamber 43, so that the friction lining 41 is put into abutment against the side cover 15, whereby the turbine runner 12 is integrated with the side cover 15. When the lock-up clutch 35 is brought into an engaged state in the above manner, the torque of the crankshaft 16 is transmitted from the side cover 15 via the piston 36 and the boss 22 to the output shaft 21 and thus, the slipping between the pump impeller 11 and the turbine runner 12 can be eliminated to enhance the transmitting efficiency. A fluctuation in engine torque during engagement of the lock-up clutch is buffered by the damper spring 40.

When the one-way clutch 25 is switched over between a locked state and the free state shown in FIG. 2, the poles 53 are swung slightly with their support projections 53a supported in the support recesses 55a of the pockets 55, but each of the support projections 53a and each of the support recesses 55a are substantially in face contact with each other at their partially columnar portions and hence, the load on the contact faces can be reduced, while permitting the swinging movement, thereby enhancing the durability. In a one-way clutch in which a pole is engaged into a notch, a phase in which an inner race and an outer race are locked is restricted by the position of the notch. In the present embodiment, however, the engage portions 53b are brought into engagement with the outer peripheral surface of the columnar inner race 51 with a frictional force and hence, the phase in which the one-way clutch 25 is locked cannot be restricted.

Opposite ends of the pole 53 accommodated in each of the pockets 55 are pressed by the back plates 57a and 58a of the pair of thrust bearings 57 and 58 for supporting the stator 13 on the boss 22 and the auxiliary-driving shaft 29. Therefore, it is possible to prevent the falling of the poles 53 without provision of a special retaining member, to thereby provide reductions in number of parts and in weight. Moreover, the width of each pole 53 can be increased up to the entire width of the pocket 55 and hence, the surface pressure acting on the pole 53 can be reduced, thereby providing reductions in number and size of the poles 53. Further, it is possible to further reduce the number of parts by forming the outer race 52 integrally with the stator 13.

Although the embodiment of the present invention has been described in detail, it will be understood that the present invention is not limited to the above-described embodiment, and various modifications in design may be made without departing from the spirit and scope of the invention defined in the claims.

For example, the one-way clutch 25 for the torque converter T has been illustrated in the embodiment, but the one-way clutch 25 according to the present invention can be used in another application as desired.

In place of the springs 54 for individually urging the poles 53 in a locking direction, bellows-shaped springs may be used to omit the positioning pins for the springs. In addition, a common annular spring for urging all of the poles 53 all together in a locking direction may be used.

What is claimed is:

1. A one-way clutch comprising locking elements each accommodated in each of pockets defined in an inner peripheral surface of an outer race, each of said locking elements being urged by a spring toward an outer peripheral surface of an inner race, thereby inhibiting the relative rotation of said inner race and said outer race relative to each other in one direction, and permitting the relative rotation of said inner race and said outer race relative to each other in the other direction, wherein each of said locking elements is formed with a partially columnar support projection and an engage portion comprising a convex curved surface, said support projection being swingably supported in and substantially in face contact with a partially columnar support recess defined in the corresponding pocket, said engage portion being in line contact with an outer peripheral surface of said inner race comprising a columnar surface.

2. A one-way clutch according to claim 1, wherein said outer race is formed integrally with a stator of a torque converter and supported on stator-supporting members with a pair of thrust bearings interposed therebetween, and said locking element accommodated in each of the pockets in said outer race is prevented from being fallen off by the thrust bearings.

* * * * *